United States Patent
Kim et al.

(10) Patent No.: US 7,302,015 B2
(45) Date of Patent: Nov. 27, 2007

(54) MOTION ESTIMATION METHOD FOR MOVING PICTURE COMPRESSION CODING

(75) Inventors: Dae-Won Kim, Seoul (KR); Hyun-Seung Lee, Suwon-shi (KR)

(73) Assignee: Samsung Electronics Co., Ltd. (KR)

( * ) Notice: Subject to any disclaimer, the term of this patent is extended or adjusted under 35 U.S.C. 154(b) by 981 days.

(21) Appl. No.: 10/428,629

(22) Filed: May 2, 2003

(65) Prior Publication Data
US 2004/0131120 A1    Jul. 8, 2004

(30) Foreign Application Priority Data
Jan. 2, 2003    (KR) ............ 10-2003-0000140

(51) Int. Cl.
*H03D 3/18* (2006.01)
(52) U.S. Cl. ............ 375/327; 375/240.16; 375/240.17; 382/107; 382/232; 382/236; 382/252
(58) Field of Classification Search ................ 382/107, 382/232, 236, 252; 375/240.16–17
See application file for complete search history.

(56) References Cited

U.S. PATENT DOCUMENTS

| | | | |
|---|---|---|---|
| 2002/0034318 A1* | 3/2002 | Sim | 382/107 |
| 2002/0181745 A1* | 12/2002 | Hu | 382/107 |
| 2004/0022419 A1* | 2/2004 | Kesaniemi | 382/107 |

\* cited by examiner

*Primary Examiner*—Curtis Odom
(74) *Attorney, Agent, or Firm*—The Farrell Law Firm

(57) ABSTRACT

A motion estimation method for moving picture compression coding that finds a motion vector at a high speed without degrading compression rate and image quality that includes estimating an initial motion point; performing a Newton-Raphson Method ("NRM") using a Mean Absolute Difference of the estimated motion point as an objective function, and finding a new motion point; determining whether a difference between the new and estimated motion points is less than a minimum error range, estimating the new motion point as the initial motion point when the difference is more than the minimum error range, and performing the NRM; and determining whether a difference between the new and estimated motion points is less than a minimum error range, estimating the new motion point as a final motion point when the difference is less than the minimum error range, and determining a motion vector.

10 Claims, 12 Drawing Sheets

| B11 | B12 | B13 |  | B1m |
|---|---|---|---|---|
| B21 | B22 | B23 |  |  |
| B31 | B32 | B33 |  |  |
| Bn1 |  |  |  | Bnm |

F(t-1)

F(t-1)

(a) 
(b) 
(c)

(d) 
(e) 
(f)

(g) 
(h) 
(i)

MOTION ESTIMATION METHOD FOR MOVING PICTURE COMPRESSION CODING

PRIORITY

This application claims priority to an application entitled "MOTION ESTIMATION METHOD FOR MOVING PICTURE COMPRESSION CODING", filed in the Korean Intellectual Property Office on Jan. 2, 2003 and assigned Serial No. 2003-00140, the contents of which are hereby incorporated by reference herein.

BACKGROUND OF THE INVENTION

1. Field of the Invention

The present invention relates to a moving picture compression coding method, and more particularly to a motion estimation method for image compression coding, and a computer-readable recording medium on which a program for implementing the motion estimation method is recorded.

2. Description of the Related Art

Typically, a mobile phone service has been limited to only a voice service in the second generation wireless network because the second generation wireless network has a narrow bandwidth, therefore the third generation wireless network such as IMT (International Mobile Telecommunication)-2000 service was recently developed to provide users with a moving image service as well as the voice service. With the increasing development of mobile technology, more users expect to see visual information different from voice information on their mobile phones, such that the next generation mobile communication importantly incorporates technology for implementing such a moving image service on mobile phones.

Typically, the size of image data is much larger than that of voice or character data. Consequently, the total size of such image data must be compressed down to a prescribed level. Provided that the size of image data is not compressed down to the prescribed level, it is impossible to process the image data in real time.

There have been proposed a variety of applications for compressing the image data, thereby making it is possible for image signals to be stored or transmitted in real time. There are a variety of image compression international standards for image compression, for example, JPEG (Joint Photograph Expert Group) serving as a still image standard, MPEG (Moving Picture Experts Group)1 for TV broadcasting as one of moving picture standards, MPEG2 for satellite broadcasting as one of moving picture standards, and MPEG4 for low bit rate transmission as one of moving picture standards. Particularly, the MPEG4 is an international standard for compression coding of digital image and audio data having a transfer rate of below 64 kbps, and therefore is a compression-coding standard for image or video data having an ultralow transfer rate and a high compression rate as compared to the MPEG1 or MPEG2, and is mainly applied to mobile telecommunications.

In this case, such image data compression is established by removing redundant data caused by similarities between data of image information and data representing the image information.

There are various kinds of such data redundancy, i.e., spatial redundancy and stochastic redundancy within one frame, and temporal redundancy between frame images. The spatial redundancy is based on similarities between values of adjacent pixels within a frame image, indicates that an arbitrary pixel has a value similar to that of its adjacent pixel, and is controlled by a DCT (Discrete Cosine Transform).

The stochastic redundancy is based on similarities between symbols within a frame image, indicates that a plurality of data are stochastically and unevenly distributed on the frame image such that an arbitrary symbol has a value similar to that of its adjacent pixel, and is controlled by a VLC (Variable Length Coding) serving as an entropy coding method. The VLC indicates a method for allocating a bit having a prescribed size proportional to a symbol size.

Finally, the temporal redundancy is based on similarities between a current frame image and a previous frame image, and is controlled by a ME/MC (Motion Estimation/Motion Compensation). In more detail, the ME is adapted to detect a motion vector between a current frame image and a previous frame image, generates a new frame image by a ME operation using the detected motion vector, subtracts the new frame image from the current frame image to remove the same data between the current frame image and the new frame image in such a way that the temporal redundancy is controlled.

FIG. 1 is a view illustrating a block diagram of a conventional system for transmitting/receiving image data. Referring to FIG. 1, the conventional system for transmitting/receiving image data includes an image data transmitter 100 for compressing image data, and transmitting a compression image signal of the image data; a satellite 1 for receiving the image signal from the image data transmitter 100, and transmitting it to a receiver; and an image data receiver 200 for receiving the image signal from satellite 1, decompressing the image signal, and restoring the original image data.

The image data transmitter 100 includes a MPEG source decoder 110 for compressing video data (VD) and audio data (AD), a text encoder 130 for compressing text data (TD), a channel encoder 150 for performing a channel encoding operation on encoded data of the MPEG source encoder 110 and the text encoder 130 to remove a noise from the encoded data, and a RF (Radio Frequency) unit 170 for modulating encoded data of the channel encoder 150, and transmitting it over a first antenna ANT1. In this manner, the signal transmitted from the transmitter 100 is relayed to the receiver 200 over the satellite 1.

The image data receiver 200 includes a baseband processor 210 for demodulating an image signal received from satellite 1 over a second antenna ANT2, thereby restoring the image signal to baseband image data, a channel decoder 220 for detecting errors of the image data received from the baseband processor 210, correcting the errors, and performing image restoration, and a MPEG decoder 230 for decompressing compressed image data received from the channel decoder 220, and restoring original image data. The TD is also decoded since the TD is also an input to channel encoder. (150)

FIG. 2 is a view illustrating a detailed block diagram of a MPEG source encoder 110 contained in the image data transmitter 100 shown in FIG. 1. Referring to FIG. 2, the MPEG source encoder 110 includes a 8×8 blocking unit 111 for dividing one frame image Vin into 8×8 blocks, a subtracter 112 for subtracting a generated frame image from a current frame image received from the 8×8 blocking unit 111, a 8×8 DCT (discrete cosine transformation) unit 113 for performing a DCT operation on the current frame image received from the subtracter 112, a 8×8 quantizer 114 for quantizing a frame image received from the 8×8 DCT unit 113, a VLC unit 115 for performing a VLC operation on a current frame image received from the 8×8 quantizer 114, a 8×8 dequantizer 117 for dequantizing a frame image received from the 8×8 quantizer 114, a 8×8 IDCT (Inverse Discrete Cosine Transform) unit 118 for performing an IDCT operation on a frame image received from the 8×8 dequantizer 117, an adder 119 for adding a frame image received from the 8×8 IDCT unit 118 and a generated frame image, a frame memory 120 for storing a frame image received from the adder 119, a 16×16 blocking unit 123 for dividing entry of one frame of image data into 16×16 blocks, a motion estimator 121 for estimating a motion vector by comparing a pixel value of a current frame image received from the 16×16 blocking unit 123 with that of a previous frame image received from the frame memory 120, a motion compensator 122 for applying a motion vector received from the motion estimator 121 to the frame image of the frame memory 120, and generating a new frame image, and a multiplexer (MUX) 116 for multiplexing image data received from the 8×8 VLC unit 115 and the motion vector received from the motion estimator 121.

One frame image has a variety of resolutions such as 720×480 and 1192×1080, etc. The motion estimator 121 for estimating a motion vector between a current frame image and a previous frame image considers each such frame image of 16×16 pixel blocks, and processes the frame image in block units.

The motion estimator 121 compares a pixel value of a current frame image F(t) with that of a previous frame image F(t−1) to estimate a moving direction of an image, i.e., a motion vector, and will hereinafter be described in more detail.

FIG. 3 is a view illustrating an exemplary blocked frame image. The 16×16 blocking unit 123 shown in FIG. 2 divides one frame image into 16×16 blocks according to the MPEG4 standard. An example of such 16×16 blocked frame image is shown in FIG. 3. As shown in FIG. 3, an overall frame image is divided into 16×16 blocks, and the overall frame image is denoted by a group of the 16×16 blocks such as B11, B12 . . . B1*m*, B21, B22 . . . Bn1 . . . Bnm.

FIG. 4 is a view illustrating a current frame image formed by partially-blocking the frame image of FIG. 3, and depicts a current frame image F(t) composed of 9 partial blocks wherein 8 partial blocks are arranged to surround an exemplary block that corresponds from the previous frame to the current frame. FIG. 5 is a view illustrating a previous frame image having block B(t−1)22 corresponding to block B(t)22 of the current frame image of FIG. 4. FIG. 5 depicts a previous frame image F(t−1) composed of 9 partial blocks wherein 8 partial blocks are arranged to surround an arbitrary block B(t−1)22 corresponding to the current block B(t)22 shown in FIG. 4. A dotted line shown in FIG. 5 indicates a search window SRW containing the same blocks as the current block B(t)22 therein. The search window SRW is determined depending on a movable range between successive two frame images comprising about 24 frames per second. A corresponding block B(t−1)22 of the SRW is extended in the range of ±block size/2.

Referring to FIG. 5, the motion estimator 121 shown in FIG. 2 compares the current block B(t)22 of FIG. 4 with each block comprising the SRW of FIG. 5. The motion estimator 121 establishes such a comparison process in the direction from the upper left end as shown in FIG. 6*a* to the lower right end. The comparison process of the motion estimator 121 is established along the same direction as an electron gun scanning direction of a cathode ray tube as shown in FIG. 6*b*. The motion estimator 121 finds the most similar matching block to the current block in order to estimate a motion vector. This algorithm for finding the most similar matching block is called a block matching algorithm.

In such a block matching algorithm, each pixel value within a block is adapted as a comparison value among blocks, and in more detail, a pixel value of a current block of a current frame image is compared to that of a corresponding block of a previous frame image. The block matching algorithm subtracts a pixel value of a corresponding block from that of a current block, finds an arbitrary block having the least error (or the least difference), calculates a position vector of a matching block on the basis of the, current block, and thereby estimates a motion vector.

In the meantime, the motion vector is generally estimated in light of two factors composed of image quality degradation prevention and high speed estimation.

There are a variety of block matching algorithms, and particularly, one of them is called a full search algorithm. This full search algorithm is adapted as an estimation reference of other algorithms because its resultant estimated image has the best image quality. However, the full search algorithm needs 24 bits in total to display a color pixel because 8 bits are assigned to each of 3 primary colors (i.e., R, G, and B). Thus, provided that such a full search algorithm is applied to all pixel values, a large number of calculations are required such that it is impossible to implement a real-time system in a very wide search range.

To solve this problem, there have been recently proposed a variety of high-speed matching algorithms, for example, a method for reducing the number of search points using a UESA (Unimodal Error Surface Assumption), a method using a multi-resolution, a method for moving a reference point using a correlation between adjacent motion vectors and performing a VSR (Variable Search Range) function, and a method for obtaining a calculation value in a block matching process, etc.

Particularly, a representative one of the method for reducing the number of search points using the UESA is a TSS (Three Step Search) method that will hereinafter be described in more detail.

FIG. 7 is an exemplary view illustrating a SRW (shown in FIG. 5) of a predetermined size. Referring to FIG. 7, the SRW is extended in all directions of a reference block having 16×16 pixels such that a large-sized search window larger than the reference block is formed. In this case, the SRW is typically extended by a size of (+block size/2) in one direction of the reference block, but FIG. 7 indicates this size of (+block size/2) as a prescribed value of +7 for the convenience of description.

FIGS. 8*a*~8*i* are exemplary views illustrating search points within a SRW determined by the conventional TSS method. The TSS method does not determine whether a current block is matched with all blocks of the SRW, but determines whether the current block is matched with one or more of 9 blocks among all blocks as shown in FIGS. 8*a*~8*i*. In this case, center points of these 9 blocks to be searched within the SRW are indicated as reference numerals 1~9 as shown in FIGS. 8*a*~8*i*.

FIGS. 9*a*~9*c* are exemplary views illustrating search points adapted for explaining the conventional TSS method. Referring to FIGS. 9*a*~9*c*, search points which may each be a center point of a block in case of using the full search method within a SRW are indicated by small circles, and 9 search points determined by the TSS method are assigned with reference numerals 1~9, respectively.

The aforementioned TSS method for such motion estimation will hereinafter be described with reference to FIGS. 9*a*~9*c*.

Firstly, a SAD (Sum of Absolute Difference) is mainly adapted to a process of finding a desired matching block in light of calculation complexity and a system performance. Here, the SAD is defined as the sum of absolute differences (or errors) between a pixel value of a current block of a current frame image F(t) and a pixel value of a block corresponding to the current block on a SRW of a previous frame image F(t−1), and is represented as the following Eq. 1:

$$SAD(x) = \sum_{i=0}^{n-1}\sum_{j=0}^{n-1} |I_c(k+i, l+j) - I_p(k+x+i, l+y+j)| \quad [Eq. 1]$$

where $I_c(k+i,l+j)$ is a pixel value of a current frame image block, $I_p(k+x+i,l+y+j)$ is a pixel value of a corresponding block on a SRW of a previous frame image, 'x' and 'y' are coordinates within the SRW, 'k' and 'l' are coordinates within a corresponding block, and 'n' is a size of a matching block.

Also, the TSS method determines a motion vector through first to third search processes using the UESA method for monotonically increasing an error value on each search point in proportion to a difference between the error value and a global motion vector. Firstly, the first search process calculates all SADs on the basis of nine search points 1~9 shown in FIG. 9a. The second search process calculates again all SADs on the basis of nine search points 21~29 of FIG. 9b on the basis of a search point '2' of FIG. 9a when a search point of a minimum SAD calculated by the first search process is '2' shown in FIG. 9a. Subsequently, the third search process calculates all SADs on the basis of nine search points on the basis of a search point '22' of FIG. 9b when a search point of a minimum SAD calculated by the second search process is '22' shown in FIG. 9b, and thereby one search point having a minimum SAD is determined as a motion vector.

The aforesaid TSS method searches all the 9 search points in each of the first to third search processes. In more detail, all the 9 search points are searched in the first search process, 8 search points other than one search point calculated by the first search process are searched in the second search process, and 8 search points other than one search point calculated by the second search process are searched in the third search process. Therefore, the TSS method searches 25 search points in total. However, considering that 24 bits are needed to display a pixel value of one point, the TSS method has an excessively long search time such that it is impossible to perform real-time processing of images using software.

SUMMARY OF THE INVENTION

Therefore, the present invention has been made in view of the above problems, and it is an object of the present invention to provide a moving picture compression coding method, and more particularly to a method for finding a motion vector at a high speed without degrading a compression rate and an image quality, and to a computer-readable recording medium on which a program for implementing the motion vector finding method is recorded.

In accordance with one aspect of the present invention, the above and other objects can be accomplished by the provision of a motion estimation method for a motion picture compression coding in a MPEG4-based motion estimation method, comprising the steps of: a) estimating an initial motion point; b) performing a Newton-Raphson method using a MAD (Mean Absolute Difference) of the estimated motion point of the step (a) as an objective function, and finding a new motion point; c) determining whether a difference between the new motion point of the step (b) and the estimated motion point is less than a minimum error range, estimating the new motion point as the initial motion point when the difference is more than the minimum error range, and performing the step (b); and d) determining whether a difference between the new motion point of the step (b) and the estimated motion point is less than a minimum error range, estimating the new motion point as a final motion point when the difference is less than the minimum error range, and determining a motion vector.

In accordance with another aspect of the present invention, there is provided a computer-readable recording medium on which a program is recorded in a motion estimation system having a processor therein, the program comprising the steps of: a) estimating an initial motion point; b) performing a Newton-Raphson method using a MAD (Mean Absolute Difference) of the estimated motion point of the step (a) as an objective function, and finding a new motion point; c) determining whether a difference between the new motion point of the step (b) and the estimated motion point is less than a minimum error range, estimating the new motion point as the initial motion point when the difference is more than the minimum error range, and performing the step (b); and d) determining whether a difference between the new motion point of the step (b) and the estimated motion point is less than a minimum error range, estimating the new motion point as a final motion point when the difference is less than the minimum error range, and determining a motion vector.

The present invention uses the Newton-Raphson method being one of optimization methods for finding a minimum value, obtains a minimum MAD by repeatedly calculating a MAD of image blocks corresponding to each frame using a second-derivative method, and calculates a motion vector in case of the minimum MAD. The present invention successively minimizes a MAD value being an objective function used for the Newton-Raphson method, and thereby finds a motion vector at a high speed.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
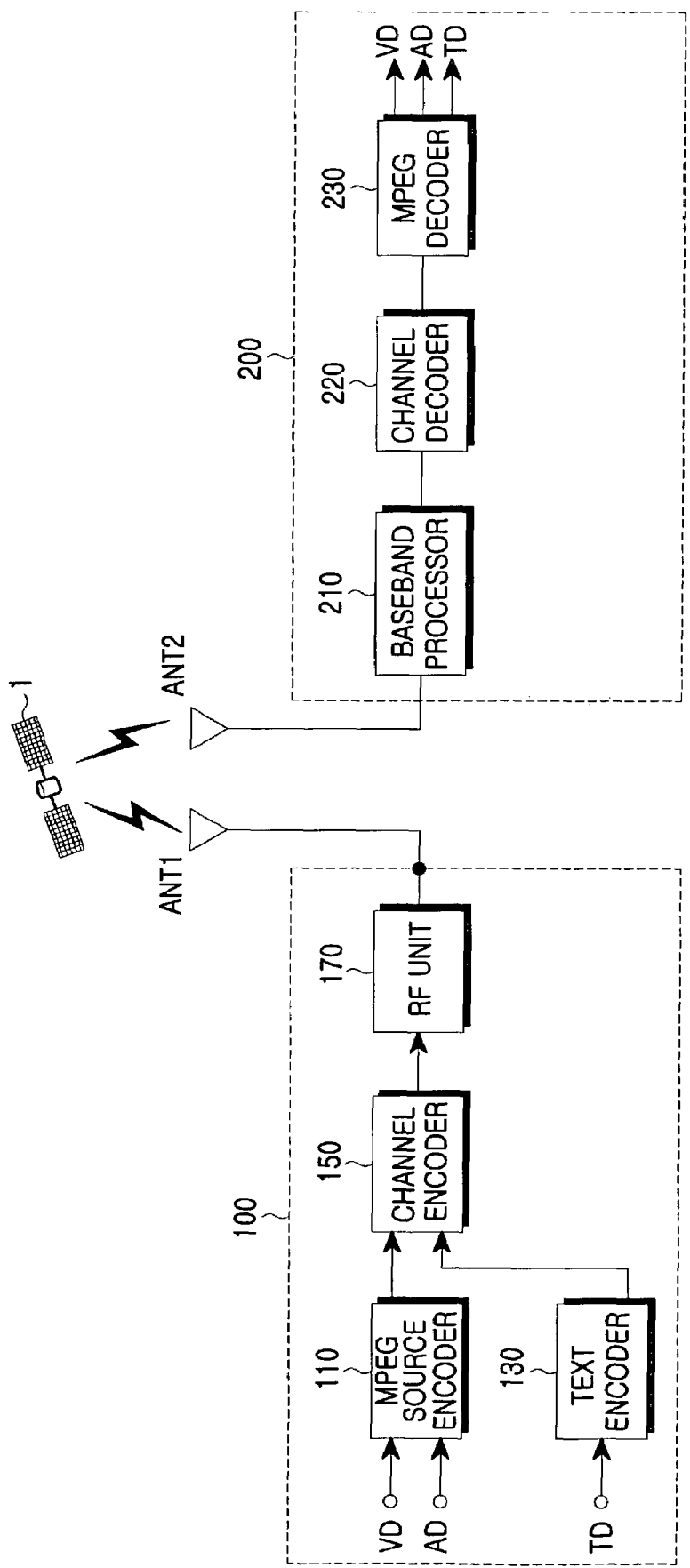
FIG. 1 is a view illustrating a block diagram of a conventional system for transmitting/receiving image data.
Figure 2:
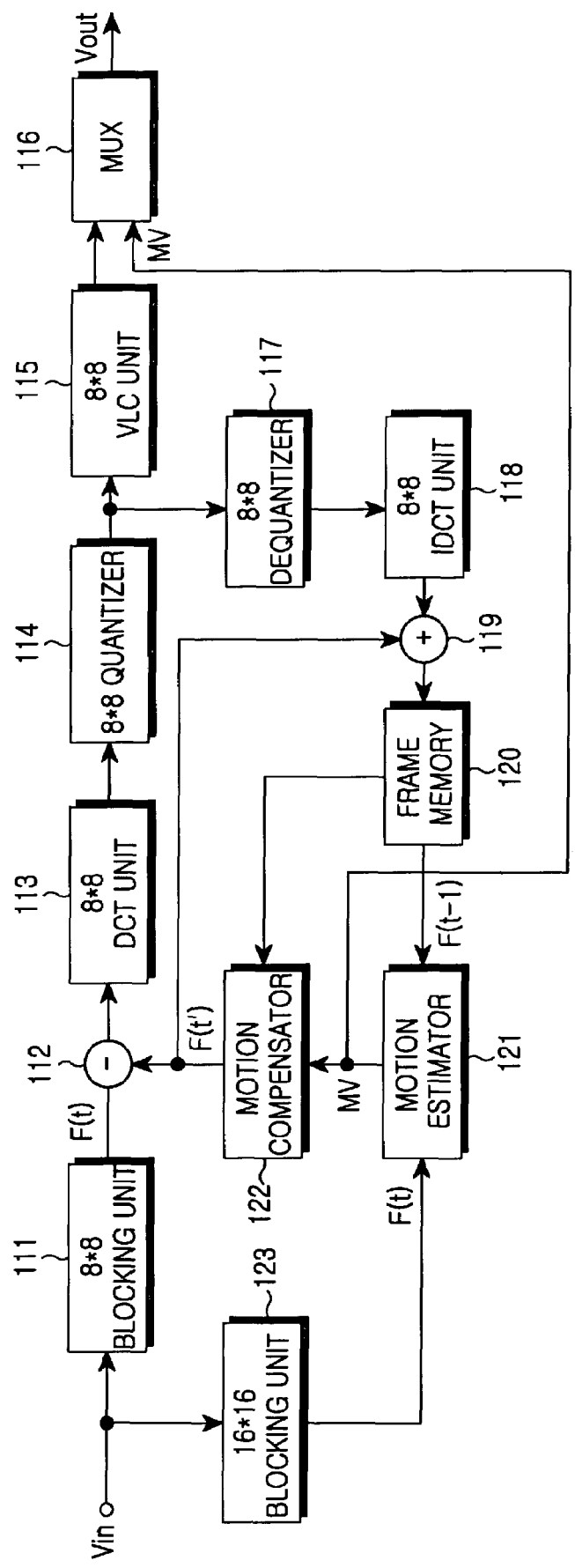
FIG. 2 is a view illustrating a detailed block diagram of a MPEG source encoder contained in the image data transmitter shown in FIG. 1.
Figures 3, 4:
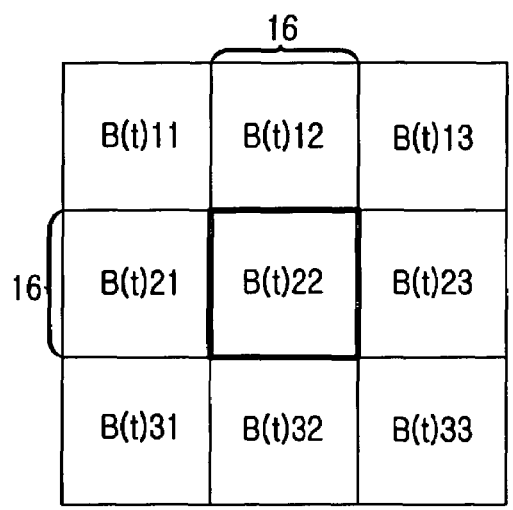
FIG. 3 is a view illustrating an exemplary blocked frame image.
FIG. 4 is a view illustrating a current frame image formed by partially-blocking the frame image of FIG. 3.
Figure 5:
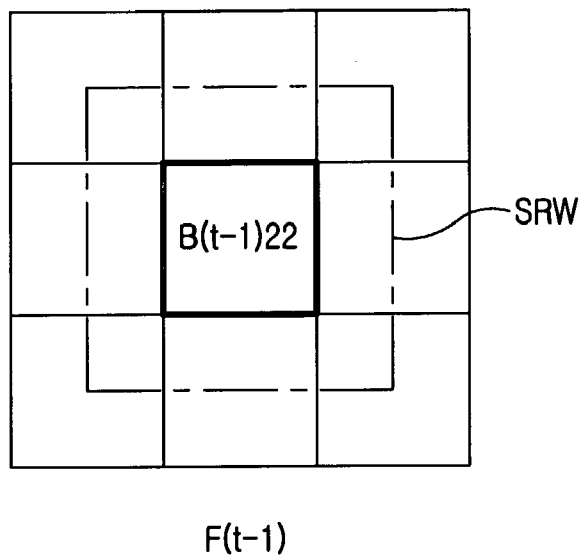
FIG. 5 is a view illustrating a previous frame image having a block corresponding to the current frame image of FIG. 4.
Figure 6A:
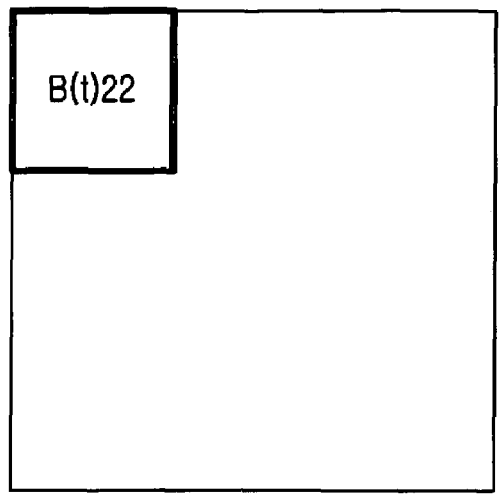
FIGS. 6a~6b are exemplary views illustrating a first search position of a current block on a search window (SRW) and a search direction of the current block within the SRW, respectively.
Figure 6B:
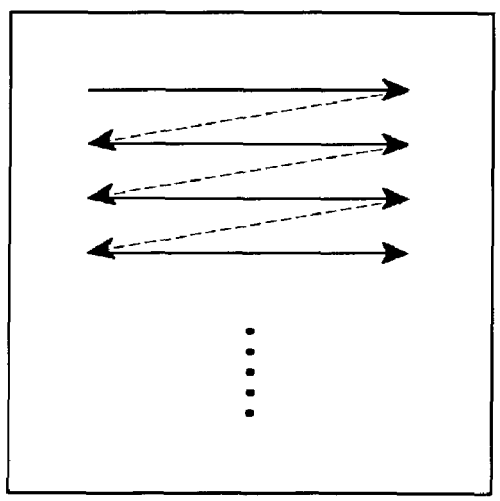
Figure 7:
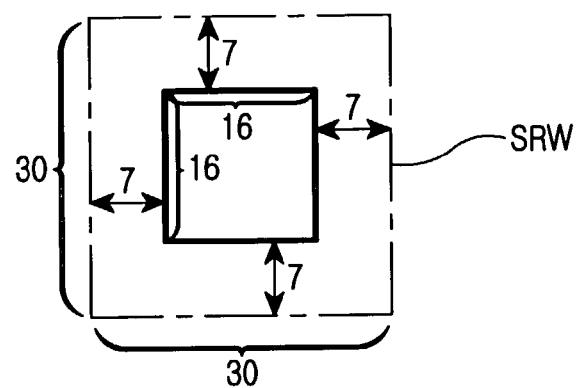
FIG. 7 is an exemplary view illustrating a SRW of a predetermined size.
Figure 8:
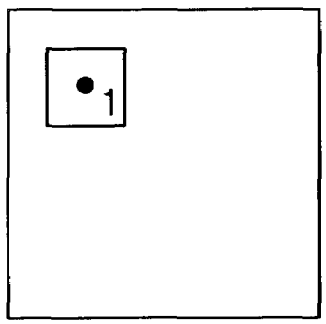
FIGS. 8a~8i are exemplary views illustrating search points within a SRW determined by a conventional TSS method.
Figure 8:
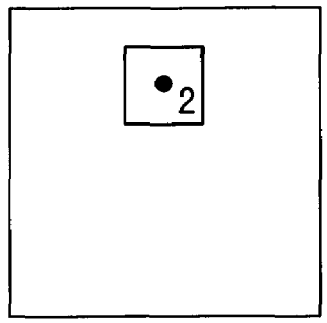
Figure 8:
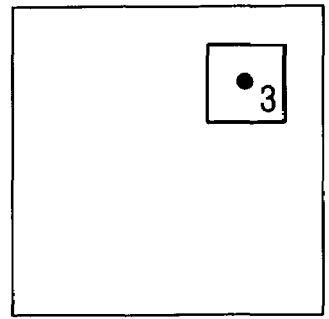
Figure 8:
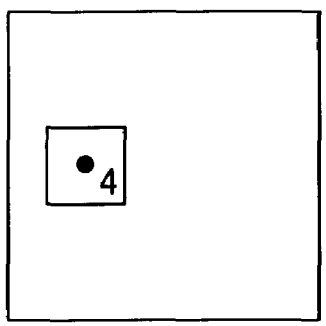
Figure 8:
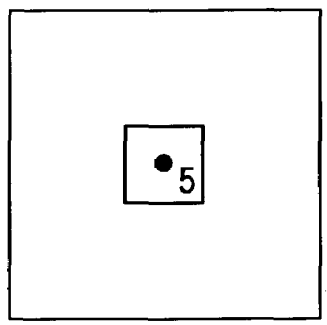
Figure 8:
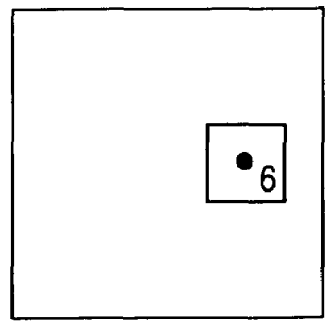
Figure 8:
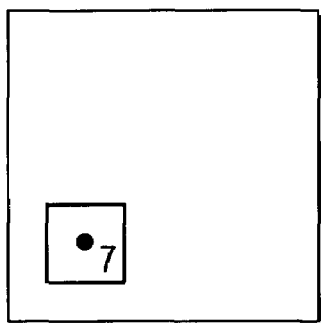
Figure 8:
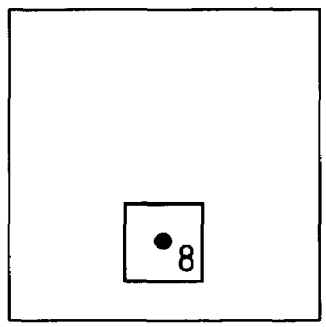
Figure 8:
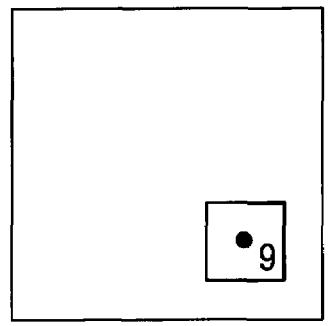
Figure 9A:
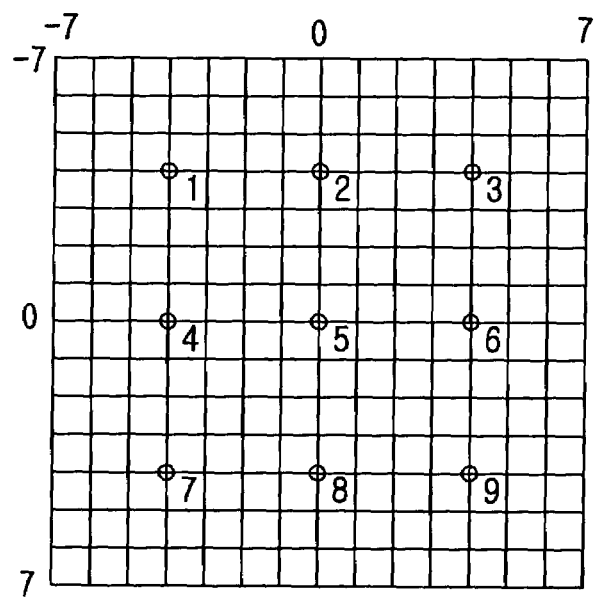
FIGS. 9a~9c are exemplary views illustrating search points adapted for explaining the conventional TSS method.
Figure 9B:
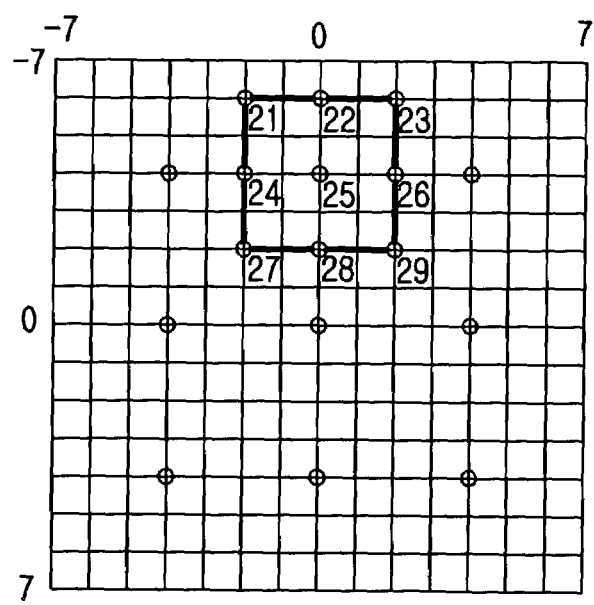
Figure 9C:
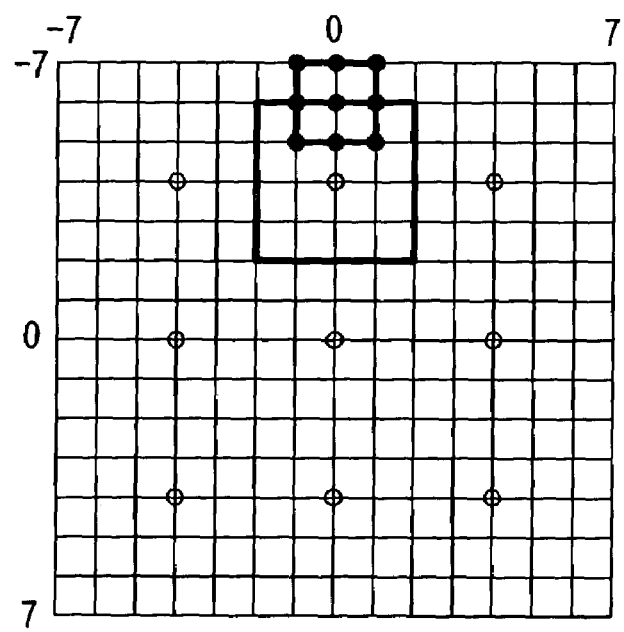

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted for clarity where they are well-known in the art.

In case of using the Newton-Raphson method adapted to the present invention as a mathematical algorithm, a general curve is indicated as a function f(x), and a zero value (i.e., x-intercept) of the function f(x) is determined. Basically, the function f(x) is approximated by its own tangent line at an arbitrary position x0 corresponding to an initial estimate, and a new estimate is formed on the basis of a zero value x1 (i.e., x-intercept) of the tangent line. This simple process may be repeated the necessary number of times to achieve a desired precision. A zero value of a tangent line corresponding to the number (i) of repetitions is represented as the following Eq. 2:

$$x_{i+1} = x_i - \frac{f(x_i)}{f'(x_i)} \quad [\text{Eq. 2}]$$

The present invention adapts a second-derivative operation of the above Newton-Raphson method. In more detail, the Newton-Raphson method using the second-derivative operation is represented as the following Eq. 3:

$$\xi^{k+1} = \xi^k - \psi \frac{\left.\frac{\partial E(\xi)}{\partial \xi}\right|_{\xi=\xi^k}}{\frac{\partial^2 E(\xi)}{\partial \xi^2}} \quad [\text{Eq. 3}]$$

where $E(\xi)$ is a MAD (Mean Absolute Difference) serving as an objective function, $\psi$ is a convergence factor, and $\xi$ is a predicted parameter value equal to an estimated position value of the present invention.

A procedure for obtaining the result shown in the above Eq.3 will hereinafter be described in more detail.

Firstly, an initial estimate of $\xi^{(0)}$ is selected, and then $\nabla_\xi E$ is calculated as shown in the following Eq. 4:

$$\nabla_\xi E = \frac{\partial E(\xi^0)}{\partial \xi} \quad [\text{Eq. 4}]$$

Next, a Hessian value of $\nabla^2$ being a second-derivative value is calculated using the following Eq. 5:

$$\nabla_\xi^2 E = \frac{\partial^2 E(\xi^0)}{\partial \xi^2} \quad [\text{Eq. 5}]$$

$\xi^{(1)}$ is then calculated using $\xi^{(0)}$ shown in the following Eq. 6:

$$\xi^1 = \xi^0 - \psi \frac{\frac{\partial E(\xi^0)}{\partial \xi}}{\frac{\partial^2 E(\xi^0)}{\partial \xi^2}} \quad [\text{Eq. 6}]$$

By repeating the above steps, a minimum one of the predicted parameter values is obtained. In this case, a stop condition for preventing infinite repetitions of the above mathematical algorithm is provided in advance. According to the present invention, the Newton-Raphson method stops operating on condition that $\xi^{(k+1)}-\xi^{(k)}$ has a sufficiently low value. To obtain maximal efficiency of the Newton-Raphson method, an initial estimated value is determined at or close to the correct value and an optimal stop value should be also derived according to the Newton-Raphson method. Therefore, the present invention discloses a method for estimating such an initial value adapted to perform motion estimation as well as a stop condition adapted to the motion estimation.

Figure 10A:
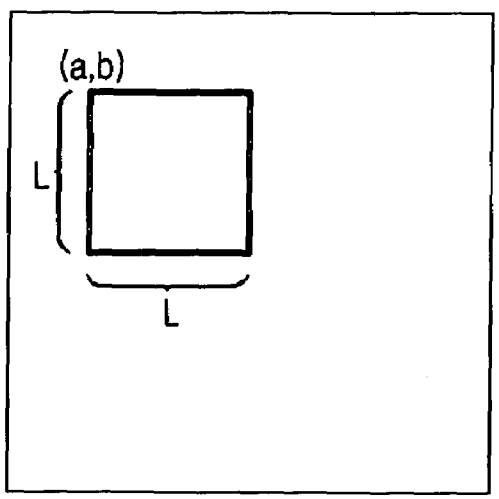
FIGS. 10a~10b are exemplary views illustrating a moving direction of a block in a motion vector detection method in accordance with the present invention.
Figure 10B:
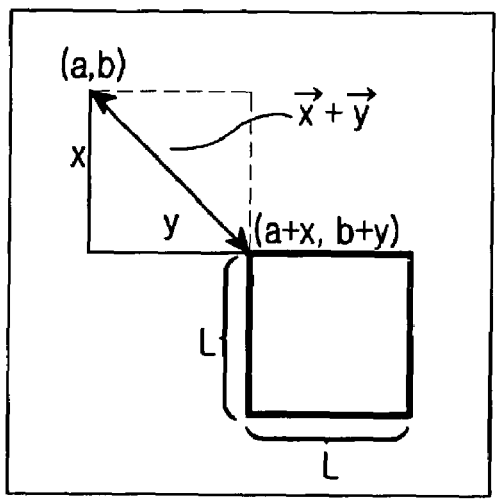

A MAD serving as an objective function in the aforementioned Newton-Raphson method will hereinafter be described with reference to FIGS. 10a~10b illustrating a moving direction of a block in a motion vector detection method in accordance with the present invention.

Firstly, the present invention uses a MAD instead of the conventional SAD adapted to perform motion detection. If the SAD is an overall error within a block, the MAD corresponds to a prescribed value formed by dividing the SAD by a block area with reference to a mean value of each pixel error within the block. That is, the MAD is adapted to the present invention for the convenience of description and better understanding of the present invention, but the SAD may be also adapted to the present invention if necessary.

The MAD adapted to the present invention performs in accordance with the following Eq. 7:

$$MAD(x, y, a, b) = \quad [\text{Eq. 7}]$$
$$\frac{1}{L^2}\sum_{i=0}^{L-1}\sum_{j=0}^{L-1}|F_n(a+i, b+j) - F_{n-1}(a+x+i, b+y+j)|$$

where $F_n(a+i,b+j)$ is a pixel value of a current frame image block, $F_{n-1}(a+x+i,b+y+j)$ is a pixel value of a corresponding block on a SRW of a previous frame image, 'x' and 'y' are coordinates within the SRW, 'a' and 'b' are coordinates within a corresponding block, and 'L' is a block size.

Namely, as shown in FIG. 10a, a point (a, b) is formed by moving a block by a point (x, y) from a point (a+x, b+y) of FIG. 10b showing a previous frame. In this case, the point (x, y) is a motion vector mainly discussed later in the description. To find this motion vector, the present invention calculates an error for every pixel, and estimates a particular point on which a minimum one of the calculated errors is established. The minimum point is determined as a moving result point of a current point in such a way that such motion estimation is established by the present invention.

Figure 11:
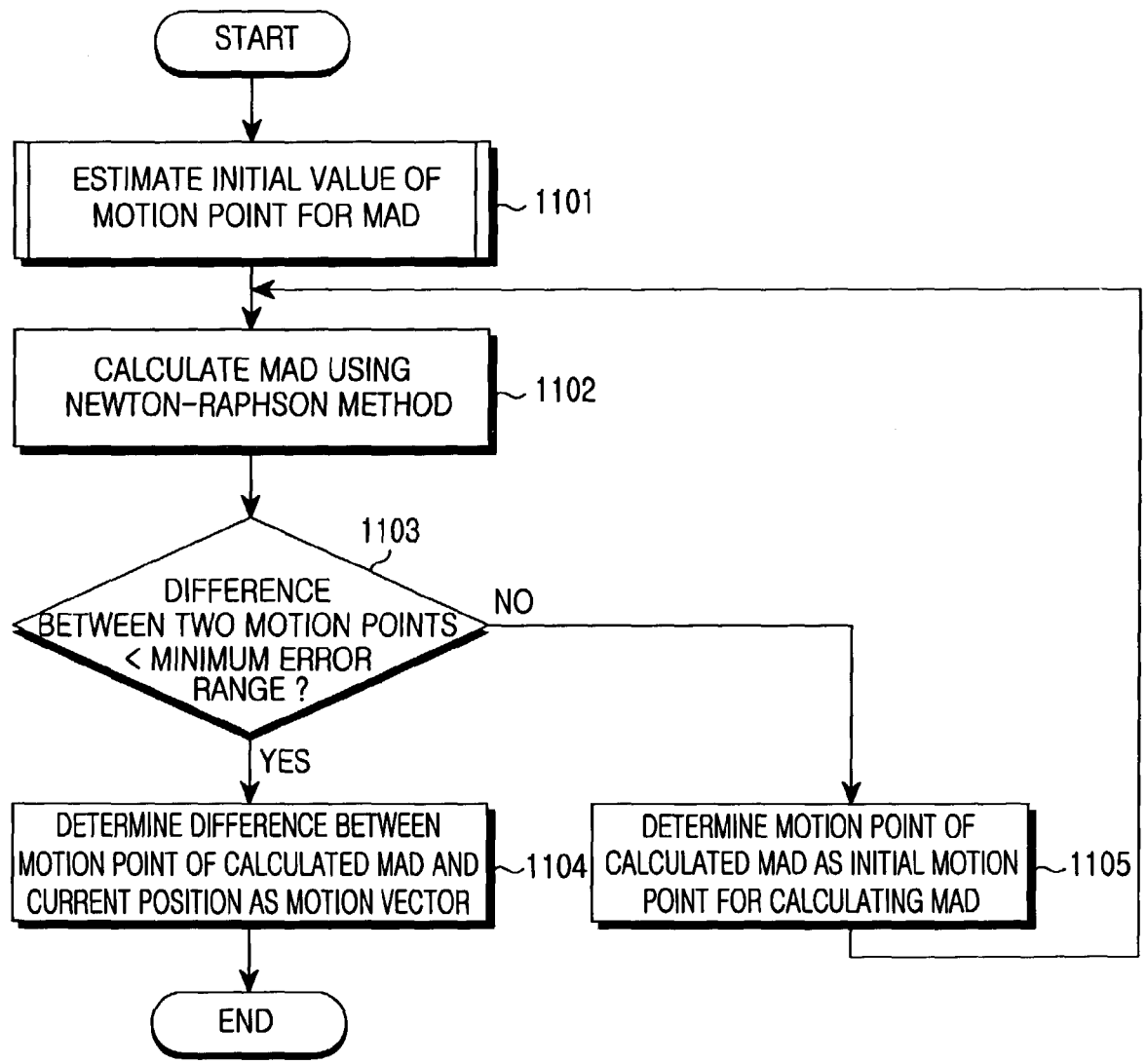
FIG. 11 is a flow chart illustrating a motion estimation method in accordance with the present invention.

FIG. 11 is a flow chart illustrating a motion estimation method in accordance with the present invention.

Referring to FIG. 11, an initial value of a motion point is estimated to calculate a MAD at step 1101. The Newton-Raphson method adapted to the present invention fluctuates in accuracy of a calculation result and the number of calculations according to the estimated initial value. Thus, a key point in the Newton-Raphson method is a method for estimating such an initial value. Such a method for estimating the initial value will be described with reference to FIG. 12.

MAD is calculated in Eq. 7 on the basis of the estimated position, and a new MAD is calculated for a new point determined using the Newton-Raphson method shown in the Eq. 3 at step 1102. It is determined at step 1103 whether a difference between the new motion point corresponding to the calculated MAD in Eq. 7 and the estimated motion point is more than a prescribed minimum error range. The minimum error range is preferably set to one pixel size according to a preferred embodiment of the present invention.

In the case where the difference between the two motion points is more than the minimum error range at step 1103, a motion point corresponding to the calculated MAD is then used as the initial or estimated value of the motion point for calculating a subsequent MAD at step 1105, and a program returns to step 1102 such that a plurality of steps from the step 1102 are repeated. In this case, in the case where a calculation value of x of the motion point is below one pixel adapted as a minimum error range proposed by the preferred embodiment of the present invention when the calculations of x and y are repeated in Eq. 3 to determine a new motion point, the next calculation of x in the Newton-Raphson Equation of Eq. 3 can be omitted, thereby effectively reducing the number of calculations. In other words, it is necessary for the calculations of x and y to find a motion point corresponding to a MAD such that the coordinates of x and y are below one pixel. Thus, the calculation of the Newton-Raphson equation shown in the Eq. 3 is repeated even though x is below one pixel and y is greater than one pixel. However, the repeated calculations of x contained in the minimum error range undesirably increases the number of unnecessary calculations, and it is assumed that x of a minimum value is assigned with the same value in subsequent calculations. Also, even in the case where y firstly has such a minimum value, y of the minimum value is also assigned with the same value in subsequent calculations.

In addition, in the case where it is determined at step 1103 that the difference between the motion point corresponding to the calculated MAD and an estimated motion point is less than the minimum error range, a difference between a motion point corresponding to the calculated MAD and a current position is determined as a motion vector at step 1104.

Figure 12:
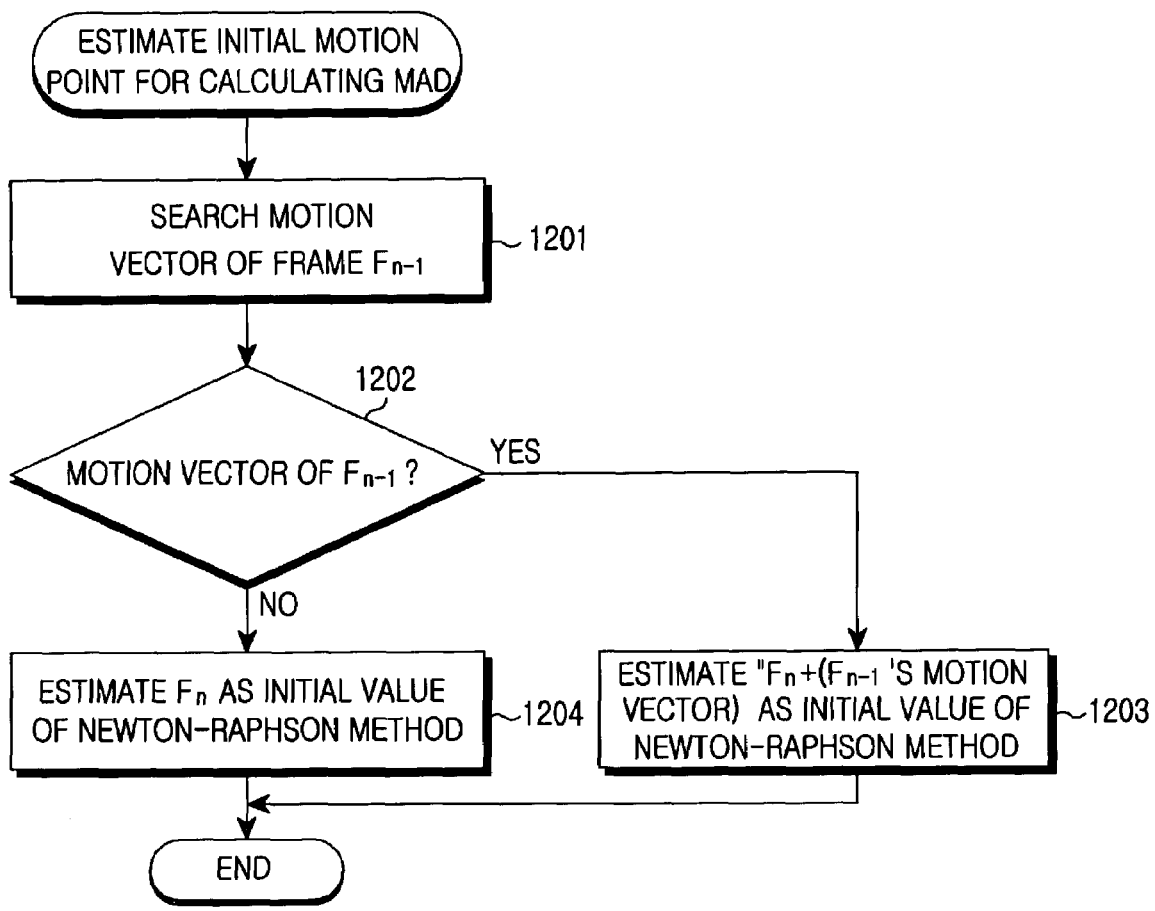
FIG. 12 is a flow chart illustrating a procedure for estimating an initial value of a motion point for calculating a MAD (Mean Absolute Difference) in accordance with the present invention.

FIG. 12 is a flow chart illustrating a procedure for estimating an initial value of a motion point for calculating a MAD (Mean Absolute Difference) in accordance with the present invention.

Referring to FIG. 12, a motion vector of a previous frame $F_{n-1}$ is searched to estimate an initial value of a motion point for the MAD at step 1201. If a motion vector of the previous frame $F_{n-1}$ exists at step 1202, a parameter "current position $(F_n)$+ motion vector of the previous frame $(F_{n-1})$" is estimated as an initial value of a motion point for calculating the MAD according to the Newton-Raphson method at step 1203.

If there is no motion vector of the previous frame $(F_{n-1})$ at step 1202, the current position $(F_n)$ is estimated as an initial value of a motion point for calculating the MAD according to the Newton-Raphson method at step 1204.

As apparent from the above description, the MPEG-4 image compression method according to the present invention adapts the Newton-Raphson method using a second-derivative equation, and thereby finds a motion vector at a high speed without degrading a compression rate and an image quality.

The present invention uses a method for estimating an initial value according to the Newton-Raphson method, and thereby more quickly and correctly performs motion estimation.

The aforementioned method according to the present invention may be implemented with a program, and may be recorded on a computer-readable recording medium such as a CD-ROM, a RAM, a floppy disc, a hard disc, and a magneto-optical disc, etc.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A motion estimation method for a motion picture compression coding in a MPEG4-based motion estimation method, comprising the steps of:
   a) estimating an initial motion point;
   b) performing a Newton-Raphson operation using a MAD (Mean Absolute Difference) of the estimated motion point of step (a) as an objective function, and finding a new motion point;
   c) determining whether a difference between the new motion point of step (b) and the estimated motion point is less than a minimum error range, and using the new motion point as the estimated initial motion point when the difference is more than the minimum error range, and re-performing step (b); and
   d) determining whether a difference between the new motion point of step (b) and the estimated motion point is less than a minimum error range, estimating the new motion point as a final motion point when the difference is less than the minimum error range, and determining a motion vector using the final motion point.

2. The method as set forth in claim 1, wherein step (a) includes the steps of:
   searching a motion vector of a previous frame $F_{n-1}$ to estimate an initial value of the motion point;
   if the motion vector of the previous frame $F_{n-1}$ exists, calculating a parameter (a current position $(F_n)$ + the motion vector of the previous frame $(F_{n-1})$) as an estimate of the initial motion point for calculating the MAD according to the Newton-Raphson operation; and
   if there is no motion vector of the previous frame $(F_{n-1})$, using the current position $(F_n)$ as the estimate of the initial motion point for calculating the MAD according to the Newton-Raphson operation.

3. The method as set forth in claim 1, wherein the MAD is represented as the following Equation:

$$MAD(x, y, a, b) = \frac{1}{L^2} \sum_{i=0}^{L-1} \sum_{j=0}^{L-1} |F_n(a+i, b+j) - F_{n-1}(a+x+i, b+y+j)|$$

where $F_n(a+i,b+j)$ is a pixel value of a current frame image block, $F_{n-1}(a+x+i,b+y+j)$ is a pixel value of a corresponding block on a search window (SRW) of the previous frame image, 'x' and 'y' are coordinates within the search window (SRW), 'a' and 'b' are coordinates within a corresponding block, 'i' and 'j' are summation indices and 'L' is a block size.

4. The method as set forth in claim 1, wherein the Newton-Raphson operation is adapted to derive a second-derivative root, and is represented as the following Equation:

$$\xi^{k+1} = \xi^k - \psi \frac{\left.\frac{\partial E(\xi)}{\partial \xi}\right|_{\xi=\xi^k}}{\frac{\partial^2 E(\xi)}{\partial \xi^2}}$$

where $E(\xi)$ is a MAD (Mean Absolute Difference) serving as an objective function, $\psi$ is a convergence factor, k is an integer and $\xi$ is a predicted parameter value equal to a position value estimated for the MAD.

5. A motion estimation method for a motion picture compression coding in a MPEG4-based motion estimation method, comprising the steps of:
   a) estimating an initial motion point;
   b) performing a Newton-Raphson operation using a SAD (Sum of Absolute Difference) of the estimated motion point of step (a) as an objective function, and finding a new motion point;
   c) determining whether a difference between the new motion point of step (b) and the estimated motion point is less than a minimum error range, and using the new motion point as the estimated initial motion point when the difference is more than the minimum error range, and re-performing step (b); and
   d) determining whether a difference between the new motion point of step (b) and the estimated motion point is less than a minimum error range, estimating the new motion point as a final motion point when the difference is less than the minimum error range, and determining a motion vector using the final motion point.

6. The method as set forth in claim 5, wherein the SAD is represented as the following Equation:

$$SAD(x) = \sum_{i=0}^{n-1} \sum_{j=0}^{n-1} |I_c(k+i, l+j) - I_p(k+x+i, l+y+j)|$$

where $I_c(k+i,l+j)$ is a pixel value of a current frame image block, $I_p(k+x+i,l+y+j)$ is a pixel value of a corresponding block on a search window (SRW) of the previous frame image, 'x' and 'y' are coordinates within the search window (SRW), 'k' and 'l' are coordinates within a corresponding block, 'i' and 'j' are summation indices and 'n' is a block size.

7. The method as set forth in claim 1, wherein the minimum error range is defined as a size of one pixel.

8. The method as set forth in claim 1, wherein step (c) of determining whether the difference between the new motion point of the step (b) and the estimated motion point is less than the minimum error range includes the step of:
   checking a difference between the estimated motion point and the new motion point on the basis of each of X-axis and Y-axis serving as orthogonal coordinate axes of the motion point.

9. The method as set forth in claim 8, wherein, if the difference between the estimated motion point and the new motion point is less than the minimum error range on the basis of only one of the X-axis and the Y-axis, the Newton-Raphson method of the step (b) does not perform a new operation on the one axis related to the less than the minimum error range, but generates the new value as in the other axis.

10. A computer-readable recording medium on which a program is encoded, said program performing the steps of:
    a) estimating an initial motion point;
    b) performing a Newton-Raphson operation using a MAD (Mean Absolute Difference) of the estimated motion point of step (a) as an objective function, and finding a new motion point;
    c) determining whether a difference between the new motion point of the step (b) and the estimated motion point is less than a minimum error range, and using the new motion point as the estimated initial motion point when the difference is more than the minimum error range, and re-performing step (b); and
    d) determining whether a difference between the new motion point of step (b) and the estimated motion point is less than a minimum error range, estimating the new motion point as a final motion point when the difference is less than the minimum error range, and determining a motion vector using the final motion point.

* * * * *